United States Patent [11] 3,578,796

| [72] | Inventors | Travis J. Hagler<br>Huntsville;<br>William R. Puckett, Trinity; Bobby G. Tanner, Huntsville, Ala. |
|---|---|---|
| [21] | Appl. No. | 762,491 |
| [22] | Filed | Sept. 25, 1968 |
| [45] | Patented | May 18, 1971 |
| [73] | Assignee | Thiokol Chemical Corporation<br>Bristol, Pa. |

[54] SPINNING AND STABILIZING SYSTEM FOR SOLID PROPELLANT ROCKET OR MISSILES
3 Claims, 4 Drawing Figs.

[52] U.S. Cl. .................................................. 244/3.23, 244/3.29
[51] Int. Cl. ............................................. F42b 13/32
[50] Field of Search ......................................... 244/3.23, 3.27—3.29

[56] References Cited
UNITED STATES PATENTS

| 2,440,271 | 4/1948 | Hickman | 244/3.28X |
| 2,644,296 | 7/1953 | Sanz et al. | 244/3.21(UX) |
| 3,260,205 | 7/1966 | Dietrich | 244/3.23 |
| 3,289,587 | 12/1966 | Donnelly et al. | 244/3.29X |
| 3,390,850 | 7/1968 | Dahlke et al. | 244/3.23 |

FOREIGN PATENTS

| 903,842 | 8/1962 | Great Britain | 244/3.29 |

*Primary Examiner*—Verlin R. Pendegrass
*Attorney*—William R. Wright, Jr.

ABSTRACT: A system for imparting a spin force to a solid propellant rocket while it is in a launch tube, and to stabilize the solid propellant rocket to discontinue the spin force after it leaves the launch tube.

PATENTED MAY 18 1971 3,578,796

Travis J. Hagler
William R. Puckett INVENTORS
Bobby G. Tanner

BY *Robt Williams Jr*

ATTORNEY

Travis J. Hagler
William R. Puckett  INVENTORS
Bobby G. Tanner

BY

ATTORNEY

SPINNING AND STABILIZING SYSTEM FOR SOLID PROPELLANT ROCKET OR MISSILES

BACKGROUND OF THE INVENTION

1. Field of the Invention

There have been many different developments in the past to provide a solid propellant rocket or missile that had a spinning force or action applied thereto before it was launched from a launch tube.

Such a spinning force or action was applied to the solid propellant rocket or missile to stabilize the solid propellant rocket or missile to provide accuracy in the flight of the solid propellant rocket or missile and to carry out certain operational requirements when such solid propellant rockets or missiles are used in a military sense either for defense or offense.

The present invention, therefore, involves the development of a solid propellant rocket or missile which is provided with a unique system that will apply a spin force or action to the solid propellant rocket or missile while it is still in a launch tube and then stabilize it after it has been launched from the launch tube.

2. Description of the Prior Art

Many types of spin force or action-applying mechanisms have been used with solid propellant rockets or missiles to spin them before launching, but such mechanisms had to generate the impulse to apply the spin force or action to such solid propellant rockets or missiles, the instant invention, however, uses the impulse created by the burning of the solid propellant grain that is positioned in the solid propellant rocket or missile to apply the spin force or action thereto.

SUMMARY OF THE INVENTION

This invention, therefore, relates to improvements in spin force or action applying and stabilizing systems wherein the impulse created by the burning of a solid propellant grain in a solid propellant rocket or missile will apply the spin force or action to the solid propellant rocket or missile prior to its launching from a launch tube and stabilize the solid propellant rocket or missile after it leaves the launch tube.

The instant invention contemplates the use of fins and vanes that are secured to a common shaft, so that after the solid propellant rocket or missile has developed the required roll torque that is needed to obtain the desired spin rate of the solid propellant rocket or missile from the impulse created by the burning of the solid propellant grain, that is directed onto the vanes before launch, further movement of the vanes after the launch of the solid propellant rocket or missile will rotate the fins into position to stabilize the solid propellant rocket or missile during the flight thereof.

It is an object of the invention, therefore, to provide a spin or action-applying and stabilizing system for solid propellant rockets or missiles that will create the spin of the solid propellant rocket or missile prior to the launch thereof and stabilize the solid propellant rocket or missile after it has been launched.

With the above objects and advantages in view, as well as others that will appear to one skilled in the art from a study of the description of the invention, it is to be understood that the invention will consist of the special arrangement of parts more fully illustrated in the accompanying drawings in which:

DESCRIPTION OF THE PREFERRED EMBODIMENT

Figure 1:
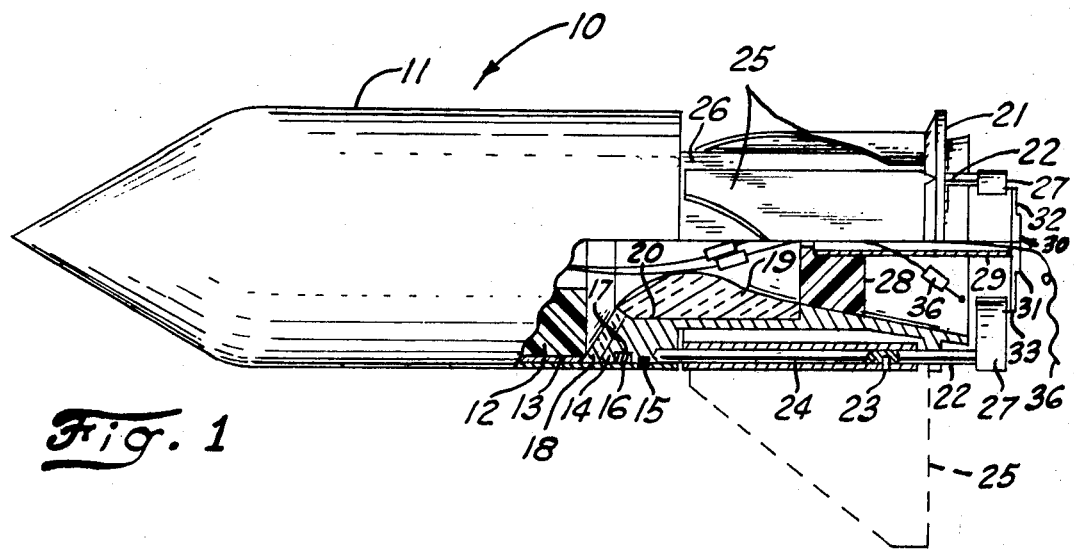
FIG. 1 is a longitudinal view of a solid propellant rocket or missile, partly in section, showing the manner of installing thereon a system embodying the invention.

Referring more in detail to the drawings wherein like parts are designated by like reference numerals, the reference numeral 10 is used to generally designate a solid propellant rocket or missile.

The solid propellant rocket or missile 10 includes a rocket motor case 11 in which is positioned a solid propellant grain 12 which is shielded from the motor case 11 by a layer of insulation 13.

A nozzle 14 is secured to the open aft end of the motor case 11 by any well-known fastening means 15 and a sealing gasket 16 is mounted in an annular groove 17 in the forward end of the nozzle 14 to prevent an escapage of combustion gases from the motor case 11 that could possibly damage the component parts of the system embodying the invention.

An annular ring of insulation 18 formed from a glass phenolic is positioned in the motor case 11 in contact with the leading edge of the nozzle 14 to protect the nozzle from the combustion gases created by the burning of the solid propellant grain 12 and a throat insert 19 formed from graphite is positioned in an annular seat 20 that is provided in the forward end of the nozzle 14.

An annular protector ring 21 is formed integral with the nozzle 14 adjacent the aft end thereof and the protector ring 21 shields the operation of the system during the flight of the solid propellant rocket or missile 10.

Figure 2:
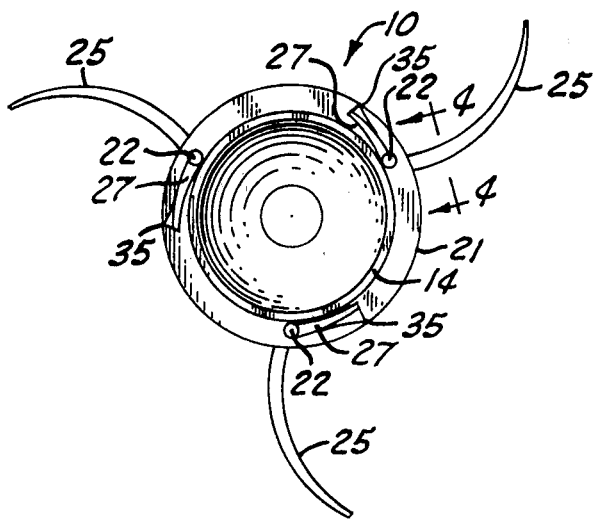
FIG. 2 is a view of the aft end of the solid propellant rocket or missile showing the fins in extended position after the solid propellant rocket or missile has left the launch tube.

Journaled for rotation at their opposite ends in the nozzle 14 and ring 21, at radially disposed distances from each other, are a plurality of shafts 22. Secured to each of the shafts by suitable fastening means 23 is a tubular member 24 from which extends an integral curved fin 25, each of which increases in diameter from the outer edge thereof to where it extends from the tubular member 24 and when the fins 25 are in preflight position, they are received in an annular recess 26 formed in the nozzle 14 intermediate of the forward end thereof and the ring 21, as shown in FIGS. 1 and 2. A vane 27 is secured to the aft end of each of the shafts 22 and the ends of the shafts 22, as shown in FIG. 1, extend beyond the aft rim of the nozzle 14.

Mounted within the throat of nozzle 14 is a closure plate 28, that is formed from any suitable material that will prevent moisture or debris from entering the motor case 11 through the nozzle 14, but will, when the solid propellant grain 12 is ignited, rupture when the combustion gases, created by the burning of the solid propellant grain 12, impinge thereon, and the peripheral edge of the closure plate 28 is contoured to have complete contact with the interior surface of the throat of the nozzle 14.

Figure 3:
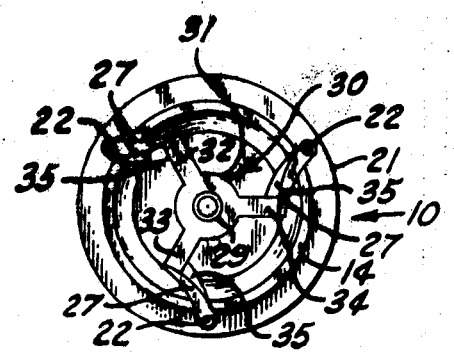
FIG. 3 is a view of the aft end of the solid propellant rocket or missile of FIG. 1 showing the vanes engaged by the retainer to maintain the vanes and fins in nonextended position to permit the solid propellant rocket or missile to be installed in the launch tube.
Figure 4:
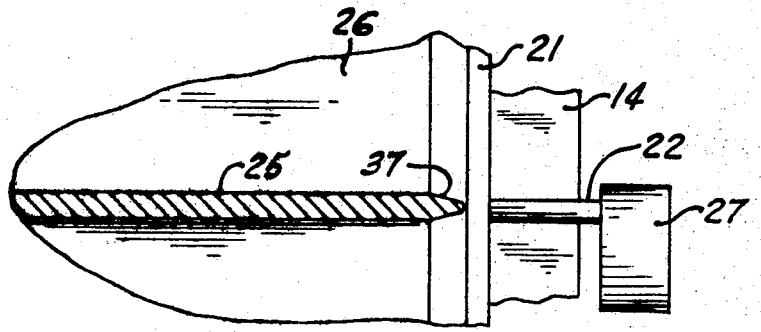
FIG. 4 is a detailed fragmentary view, partly in section, and taken on the line 4—4 of FIG. 2.

Fixed at one end to the aft central portion of the closure plate 28, is a phenolic tubular member 29 and fixed to the opposite or aft end of the tubular member 29 is a retainer 30 and the retainer 30 comprises a disc 31 from which extend, in equally spaced relation to each other, three integral arms 32, 33 and 34. When in the position, as shown in FIG. 3, the outer ends of the integral arms 32, 33 and 34 engage a projection 35 that extends outwardly from and is integral with one edge of each of the vanes 27. As shown in FIG. 1, a conventional ignition system 36, for the ignition of the solid propellant grain 12, is shown in position as is conventional for this type of solid propellant rocket or missile 10.

After the major component parts of the system have been mounted on the rocket motor case 11, such assembly will assume the position as shown in FIG. 2. Then the closure plate 28 will be forced into the throat of the nozzle 14 and when the arms 32, 33 and 34 are in position to engage the projections 35 on the vanes 27, the fins 25 are moved into position, as shown in FIG. 1, and the closure plate 28 is forced further into the throat of the nozzle 14, so that the system will assume the position shown in FIG. 3. The solid propellant rocket or missile 10 is now in condition to be positioned in the launch tube, not shown.

When it is desired to launch the solid propellant rocket or missile 10, the ignition system 36 is actuated to ignite the solid propellant grain 12, as the solid propellant grain 12 burns and combustion gases are created by the burning thereof, the closure plate 28 is ruptured and the pieces thereof are blown outwardly of the nozzle 14, at the same time the tubular member 29 and the retainer 30 secured thereto, will also be blown outwardly of the nozzle 14. In this position of the system, the combustion gases will impinge upon the vanes 27 to apply spin force or action to the solid propellant rocket or missile 10 to start the solid propellant rocket or missile to start to spin before it leaves the launch tube. At this time the launch tube will confine and prevent outward movement of the fins 25, thus, the fins 25 and the vanes 27 will be retained in substantially the same position, as shown in FIG. 1, during the launch mode of the solid propellant rocket or missile 10.

As soon as the solid propellant rocket or missile 10 exits from the launch tube, the fins 25 will be forced outwardly to assume the position, as shown in FIG. 2, by the jet force that is created by the combustion gases and is applied to each of the vanes 27 and by the action of the centrifugal force. In full extended position, the aft edge of each of the fins 25 will be received in three equally spaced slots 37 that are formed in the inclined face of the ring 21. The edge of each of the fins 25 is shaped to be complementary with the slots 37, so that the fins 25 will be rigidly retained in extended position, as shown in FIG. 2. It will also be noted from this FIG. that when the fins 25 are secure, as stated in the flight mode, the vanes 27 will occupy a position overlying the aft surface of the protector rim 21 and thus the vanes 27 are positioned so that they will no longer be exposed to the combustion gases. There will be no further spin force or action applied to the solid propellant rocket or missile 10, thus, the fins 25 will stabilize the solid propellant rocket or missile 10 to prevent further spinning thereof. Also no in-stream will impinge upon the vanes 27, since they are protected from the in-stream by the protector ring 21.

There has thus been provided a system which will create spin force or action that will be applied to a solid propellant rocket or missile during the launch mode thereof and create a stabilizing action thereon during the flight thereof, and it is believed that from the foregoing description the mode of operation, as well as the structure of the system will be apparent to one skilled in the art, it being further understood that variations in such mode of operation and construction may be adhered to provided such variations fall within the spirit of the invention and the scope of the appended claims.

We claim:

1. In a rocket or missile including a rocket motor case wherein a flow of gases is produced, and a nozzle secured to the aft end thereof and through which said gases flow, the improvement comprising the provision of a plurality of shafts mounted thereon in parallel relationship to the longitudinal axis of said nozzle with a vane and a fin fixedly mounted on each shaft and the vanes positioned to have the impulse created by the flow of gases through the nozzle to impinge thereon to apply a spin force to the rocket or missile during the launch mode thereof and while the fins are not extended, and the vanes removed from the flow of gases when the fins are extended.

2. In a rocket or missile as in claim 1, the further improvement comprising the provision of a closure plate that is mounted in the nozzle and with vane retaining means attached only to the closure plate.

3. In a solid propellant rocket or missile as in claim 1, the further improvement comprising a notch engaging the edge of each of said fins to retain said fins in extended position to apply the stabilizing action to said solid propellant rocket or missile during the flight mode thereof.